(12) United States Patent
Nelson (10) Patent No.: US 12,017,575 B1
(45) Date of Patent: Jun. 25, 2024

(54) SWING LATCH LOCKING ASSEMBLY FOR HEIGHT-ADJUSTABLE TWISTLOCKS

(71) Applicant: Buffers USA, Inc., Jacksonville, FL (US)

(72) Inventor: Jim Nelson, St. Augustine, FL (US)

(73) Assignee: BUFFERS USA, INC., Jacksonville, FL (US)

( * ) Notice: Subject to any disclaimer, the term of this patent is extended or adjusted under 35 U.S.C. 154(b) by 743 days.

(21) Appl. No.: 17/205,629

(22) Filed: Mar. 18, 2021

Related U.S. Application Data

(60) Provisional application No. 62/991,265, filed on Mar. 18, 2020.

(51) Int. Cl.
B60P 7/13 (2006.01)

(52) U.S. Cl.
CPC .................. B60P 7/132 (2013.01)

(58) Field of Classification Search
CPC ............ B60P 7/0807; B60P 7/13; B60P 7/132
USPC .................................. 410/72, 73, 76, 82, 83
See application file for complete search history.

(56) References Cited

U.S. PATENT DOCUMENTS 5,160,224 A * 11/1992 Schwiebert ............ B60P 7/132
410/82
6,092,967 A * 7/2000 Schulz ................... B60P 7/132
410/82
8,562,265 B2 * 10/2013 Hay ................................ 410/82

* cited by examiner

Primary Examiner — Stephen T Gordon
(74) Attorney, Agent, or Firm — BROWDY AND NEIMARK, P.L.L.C.

(57) ABSTRACT

A locking latch assembly for a twistlock assembly that is adjustable over a range of heights of a load level of the twistlock assembly relative to a deck level includes a base bracket configured to be secured to a housing of the twistlock assembly, and a swing latch having a central slot. An axle passes through the base bracket, the swing latch being secured around the axle to allow the swing latch to swing relative to the base bracket. At least one pin is secured on the base bracket, the at least one pin engaging a first surface of the swing latch when the swing latch is in a substantially vertical locked position in which the swing latch is at a first angular position relative to the base bracket, and engaging a second surface of the swing latch when the swing latch is in an unlocked position in which the swing latch is at a second angular position relative to the base bracket. The at least one pin is configured to be disengaged from the swing latch to allow the swing latch to swing relative to the base bracket. The slot of the swing latch has a width sized to allow a T-handle attached to a T-shaped locking pin of the twistlock assembly to pass therethrough and to be substantially restricted from rotational movement while the swing latch is in the substantially vertical locked position, and has a length sized to allow the T-handle of the twistlock assembly to pass therethrough throughout all of the range of heights of the twistlock assembly.

20 Claims, 7 Drawing Sheets

SWING LATCH LOCKING ASSEMBLY FOR HEIGHT-ADJUSTABLE TWISTLOCKS

TECHNICAL FIELD

The field of this invention generally relates to locking mechanisms for twistlock assemblies that secure shipping containers to the chassis of semi-trailer trucks and the like, and more particularly to swing latch locking assemblies for locking the locking pins of height-adjustable vehicle twistlock assemblies in both extended and non-extended positions.

BACKGROUND

Twistlock assemblies were developed to secure ISO shipping containers to semi-trailer container chassis and flatbeds (collectively referred to as "vehicles" herein). There are typically four twistlock assemblies per vehicle and each includes a housing and a T-shaped locking pin. A twistlock housing has a hole for the T-shaped locking pin and can be, but is not limited to, a cantilever type welded to vehicle bolster ends, or drop-in type welded in a cutout of the bolster ends, or simply a shear block welded into a bolster tube forming a housing. The T-shaped twistlock locking pin fits inside a hole in the twistlock housing and can be rotated from an unlocked position to a locked position. When a shipping container is loaded on a vehicle, the four corner castings on the shipping container rest on the top of each twistlock housing. The locking pin protrudes upward through the rectangular ISO aperture hole of each corner casting and can be rotated to locked position so that the shipping container is locked to the vehicle. This locking action enables safe and secure transporting of the shipping container.

Operation of each twistlock is typically accomplished manually by a person standing on the ground in front of each twistlock assembly. Once the container is loaded onto the four opened twistlocks on the vehicle, the twistlocks are manually locked by moving a handle attached to the bottom of the twistlock locking pin about a quarter turn to place the head of the T-shaped twistlock locking pin perpendicular to the corner casting aperture hole. To open the lock the manual procedure is reversed by moving the handle in the opposite direction.

Certain twistlock assemblies are height-adjustable. Typically, such height-adjustable twistlock assemblies are designed to overcome the camber with which most aluminum flatbeds are manufactured (only steel flatbeds are flat; aluminum flatbeds sag too much to be flat when unloaded). If a 40-foot or 53-foot container is placed on a 40-foot or 53-foot aluminum flatbed, the camber in the middle of the aluminum flatbed might cause the container to be in a rocking position that would make it difficult to lock the container down onto the flatbed on the four corner twistlock assemblies. Height-adjustable twistlocks overcome the camber by having the capability of being screwed up from the flatbed deck to accommodate an elevated container, i.e., in order to accommodate a gap that might exist between the bottom surface of a corner casting of a shipping container and the top surface of the flatbed deck at the location of the particular corner casting. The locks are manually adjusted up before the container is loaded. Once the container is loaded the locks are manually locked.

Height-adjustable twistlock assemblies may include internal detent mechanisms for positioning the T-shaped twistlock locking pin in its locked position within the twistlock assembly.

It is known to employ swing latches and gravity latches to lock the pins of retractable or non-retractable vehicle twistlocks, but these swing latches and gravity latches do not accommodate height-adjustable twistlock assemblies.

SUMMARY

It is an object of the present invention to provide a simple, convenient, and reliable locking mechanism for height-adjustable twistlock assemblies that is economical to manufacture.

According to the invention, a locking latch assembly for a twistlock assembly that is adjustable over a range of heights of a load level of the twistlock assembly relative to a deck level includes a base bracket configured to be secured to a housing of the twistlock assembly, and a swing latch having a central slot. An axle passes through the base bracket, the swing latch being secured around the axle to allow the swing latch to swing relative to the base bracket. At least one pin is secured on the base bracket, the at least one pin engaging a first surface of the swing latch when the swing latch is in a substantially vertical locked position in which the swing latch is at a first angular position relative to the base bracket, and engaging a second surface of the swing latch when the swing latch is in an unlocked position in which the swing latch is at a second angular position relative to the base bracket. The at least one pin is configured to be disengaged from the swing latch to allow the swing latch to swing relative to the base bracket. The slot of the swing latch has a width sized to allow a T-handle attached to a T-shaped locking pin of the twistlock assembly to pass therethrough and to be substantially restricted from rotational movement while the swing latch is in the substantially vertical locked position, and has a length sized to allow the T-handle of the twistlock assembly to pass therethrough throughout all of the range of heights of the twistlock assembly.

The design is uncomplicated yet can be very effective and economical to manufacture and very lightweight yet strong enough for its purpose. The locking assembly serves as a reliable positive locking mechanism in addition to an internal positioning mechanism of a height-adjustable twistlock assembly.

The details of various embodiments of the invention are set forth in the accompanying drawings and the description below. Numerous other features and advantages of the invention will be apparent from the description, the drawings, and the claims.

DETAILED DESCRIPTION

Figure 1:
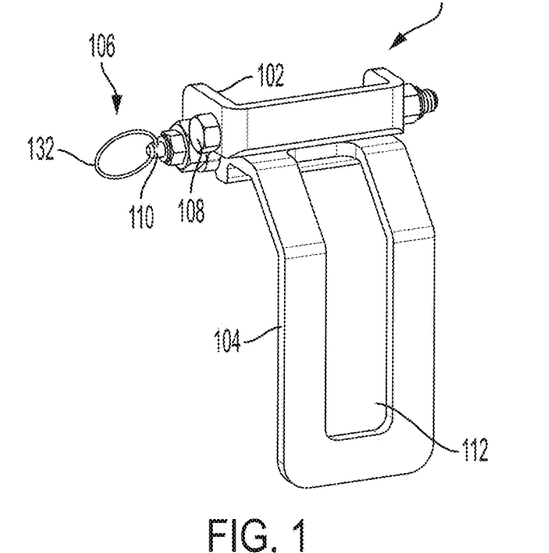
FIG. 1 is a perspective view of a swing latch assembly according to the invention.

With reference to FIG. 1, there is shown a swing latch locking assembly 100 according to the invention, which includes a base bracket 102, which is to be welded to the bottom of the twistlock housing, a swing latch 104, which swings from an axle bolt 108 on base bracket 102, and a pull pin assembly 106 fitted on base bracket 102. Swing latch 104 is a substantially flat rectangular element having a three-inch-long vertical slot 112 in its center, the substantially flat rectangular element having a main lower portion and an upper portion that is angled with respect to the main lower portion.

Figure 2:
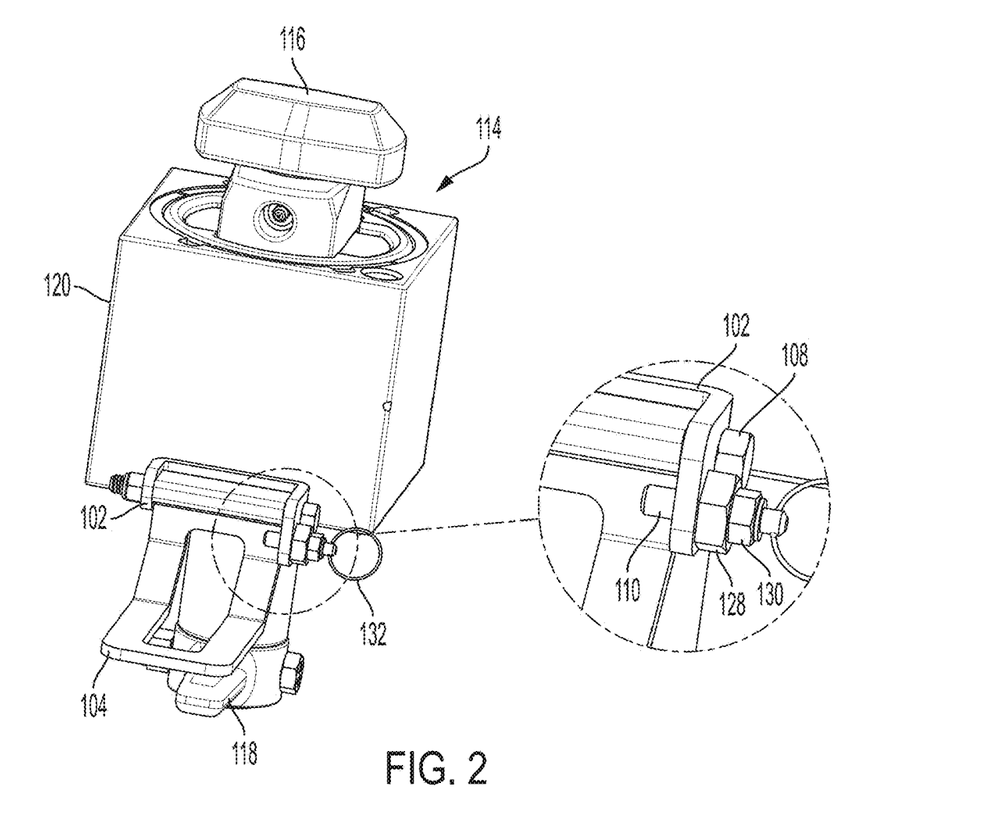
FIG. 2 is a perspective view of the swing latch assembly of FIG. 1 welded to a height-adjustable twistlock assembly, with the swing latch assembly in the unlocked position.

Pull pin assembly 106 controls the position of swing latch 104 with two position: unlocked, in an inactive open position, with the swing latch in close to a horizontal position, and locked, in an active engaged position, with the swing latch in a substantially vertical position. Pull pin assembly 106 includes a spring-loaded horizontal pin 110 that acts on swing latch 104 close to the axle bolt 108 on base bracket 102 with which swing latch 104 is connected to base bracket 102. Bolt 108 passes all the way through base bracket 102 and functions as an axle on which swing latch 104 swings. As is shown in FIG. 2, nut 128 of pull pin assembly 106 is welded to base bracket 102, and nut 130 is part of the head of pull pin 110. When a user pulls on ring 132 of pull pin assembly 106, pull pin 110 retracts toward ring 132.

Figure 3:
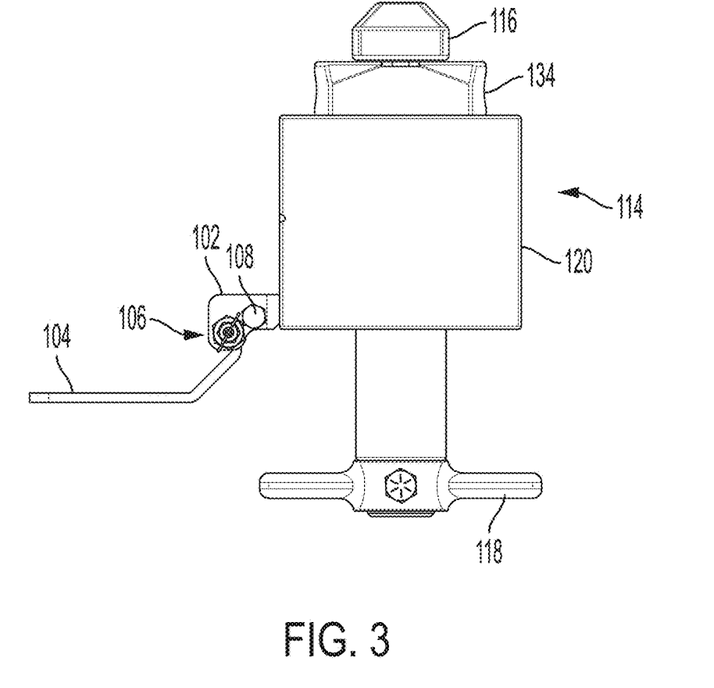
FIG. 3 is a side view of the swing latch and twistlock assemblies of FIG. 2.
Figure 4:
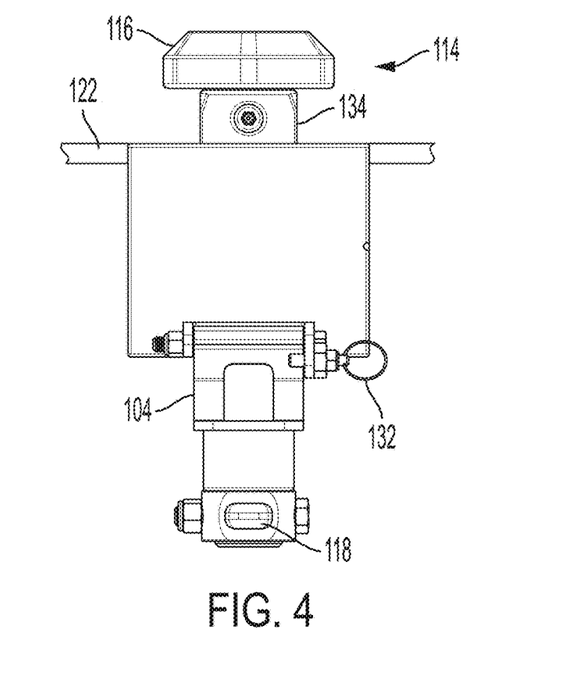
FIG. 4 is a front view of the swing latch and twistlock assemblies of FIG. 2 as viewed from a direction perpendicular to the view shown in FIG. 3.

FIGS. 2-4 illustrate swing latch locking assembly 100 attached to height-adjustable vehicle twistlock assembly 114, with swing latch 104 being shown in the unlocked position. Base bracket 102 is welded onto a side surface of twistlock housing base 120 near the bottom of the twistlock base, twistlock housing base 120 being mounted, such as by welding, to flatbed deck 122 of a vehicle at the top of twistlock housing base 120. Pull pin 110 locks swing latch 104 in the up/unlocked position, to enable a user to operate handle 118 of twistlock assembly 114 by rotating handle 118 to rotate T-shaped twistlock pin 116, the head of which is positioned above shear block 134 and the length of which passes through shear block 134 and twistlock housing base 120 and is rigidly attached to T-handle 118.

Figure 5:
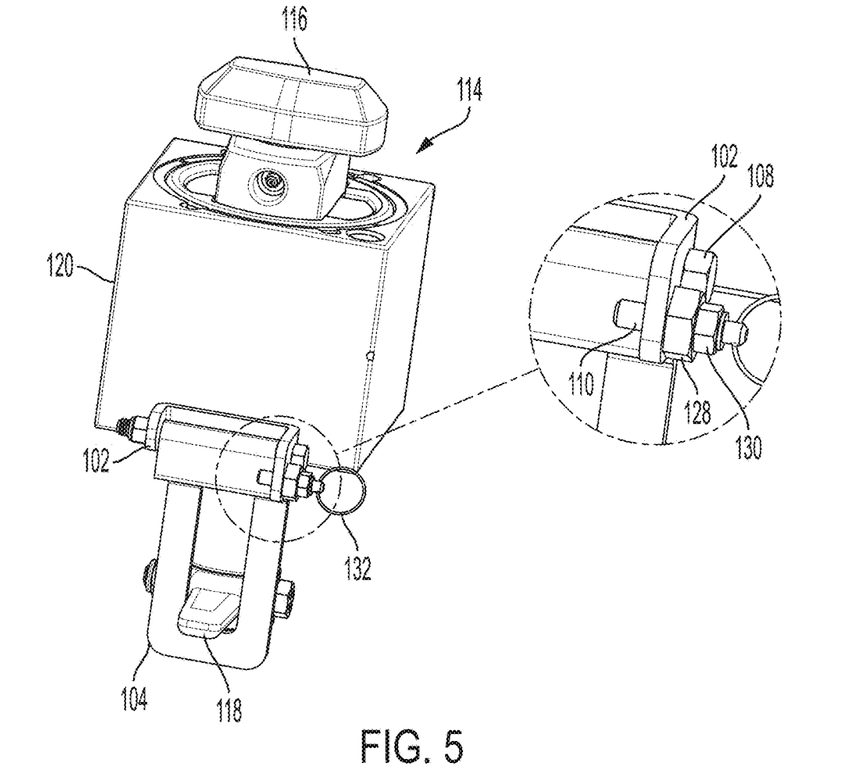
FIG. 5 is a perspective view of the swing latch assembly of FIG. 1 welded to a height-adjustable twistlock assembly, with the swing latch assembly in the locked position.
Figure 6:
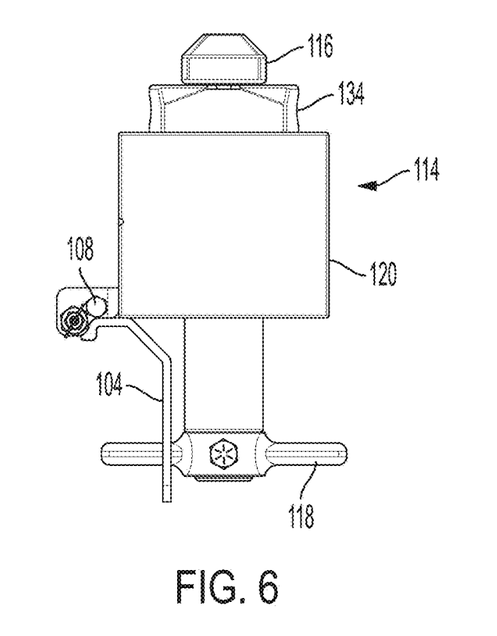
FIG. 6 is a side view of the swing latch and twistlock assemblies of FIG. 5.
Figure 7:
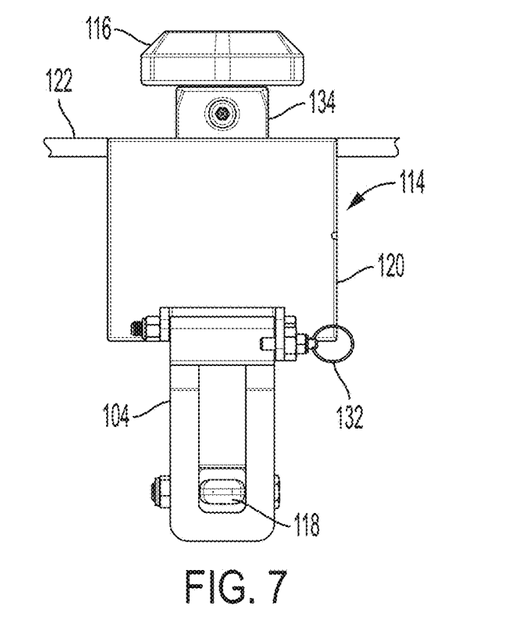
FIG. 7 is a front view of the swing latch and twistlock assemblies of FIG. 5 as viewed from a direction perpendicular to the view shown in FIG. 6.

FIGS. 5-7 illustrate swing latch locking assembly 100 attached to height-adjustable twistlock assembly 114, with the swing latch assembly in the unlocked position. In this configuration, pull pin 110 locks swing latch 104 in the down/locked position in which three-inch vertical slot 112 in swing latch 104 captures handle 118 of twistlock assembly 114 so that handle 118 cannot be rotated to rotate twistlock pin 116.

It can be seen that swing latch locking assembly 100 forms a lock to prevent twistlock pin 116 from twisting from a locked position to an open position, by locking and thereby controlling handle 118, which is bolted to the bottom end of pin 116. This lock is required only when pin 116 is in the locked position, and is secondary to an internal locking mechanism of height-adjustable twistlock assembly 114 in the form of steel detent balls that protrude outward from the portion of T-shaped twistlock pin 116 that passes through shear block 134 and that press in an outwards direction to engage with grooves inside shear block 134.

Swing latch 104 is designed so that it can operate in any position within a vertical space of three inches. Swing latch 104 locks in on handle 118 through three-inch vertical slot 112 on swing latch 104, allowing handle 118 to be locked by swing latch 104 even after handle 118 has moved up to three inches vertically due to the position of twistlock pin 116 being height adjusted by a user.

The configuration and design of swing latch 104 enables the swing latch to work on pin handle 118 in all positions over a vertical range of three inches and to be able to be locked in position throughout this three-inch range to prevent unintentional unlocking. Thus, swing latch 104 can operate from the lowest to the highest load level of the twistlock assembly. In this manner, swing latch locking assembly 100 acts as a secondary lock on handle 118 on a height-adjustable vehicle twistlock.

Figure 14:
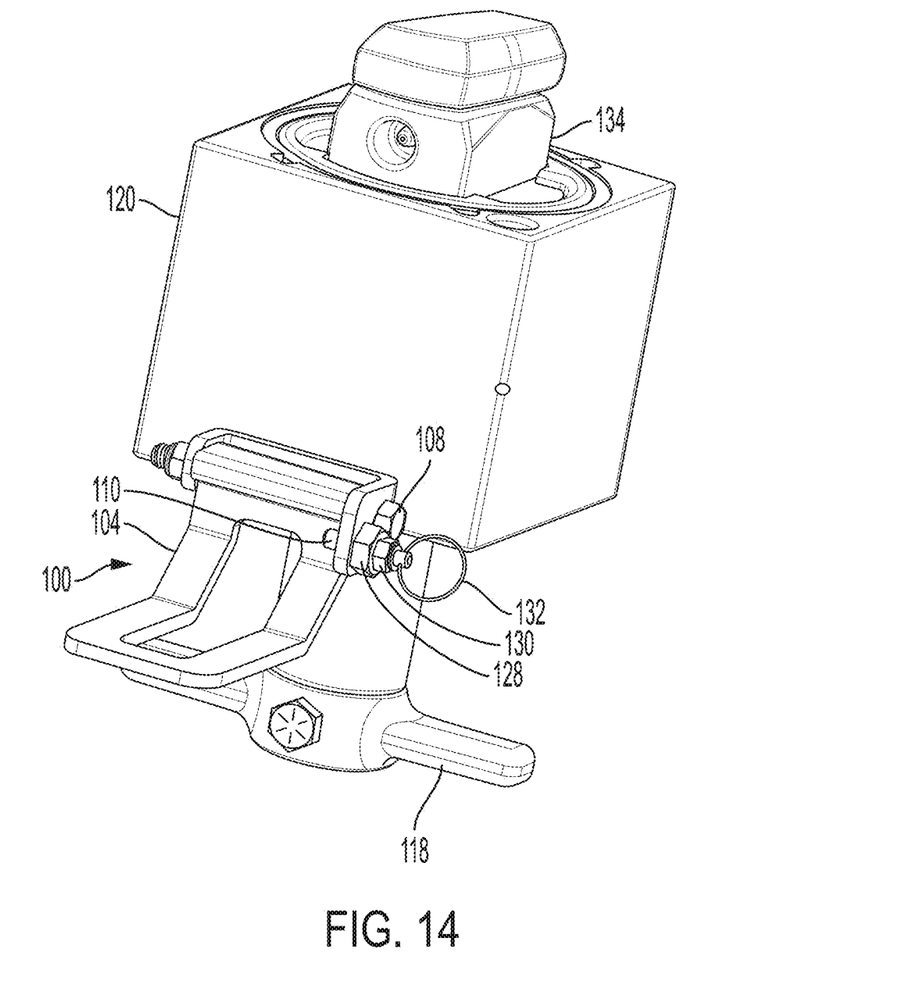
FIG. 14 is a partial perspective view of the swing latch and twistlock assemblies of FIG. 2 but enlarged and from a slightly different perspective to show the open swing latch assembly in greater detail and clarity.
Figure 15:
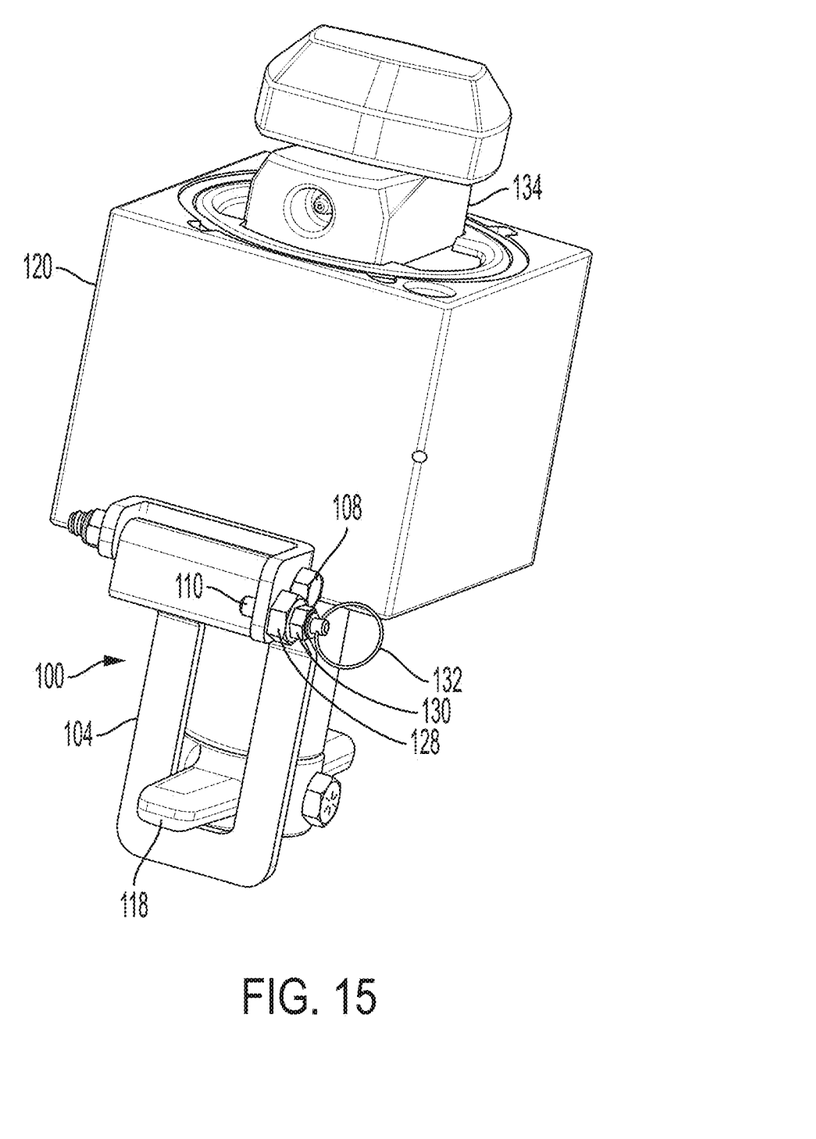
FIG. 15 is a partial perspective view of the swing latch and twistlock assemblies of FIG. 5 but enlarged and from a slightly different perspective to show the locked swing latch assembly in greater detail and clarity.

FIGS. 14 and 15 are similar to FIGS. 2 and 5 respectively, but enlarged and from a slightly different perspective to show swing latch assembly 100 in greater detail and clarity. It can be seen in FIGS. 14 and 15 that pull pin 110 engages a first surface of swing latch 104 when the swing latch is in a substantially vertical locked position, and engages a second surface of the swing latch when the swing latch is in an unlocked position.

Figure 8:
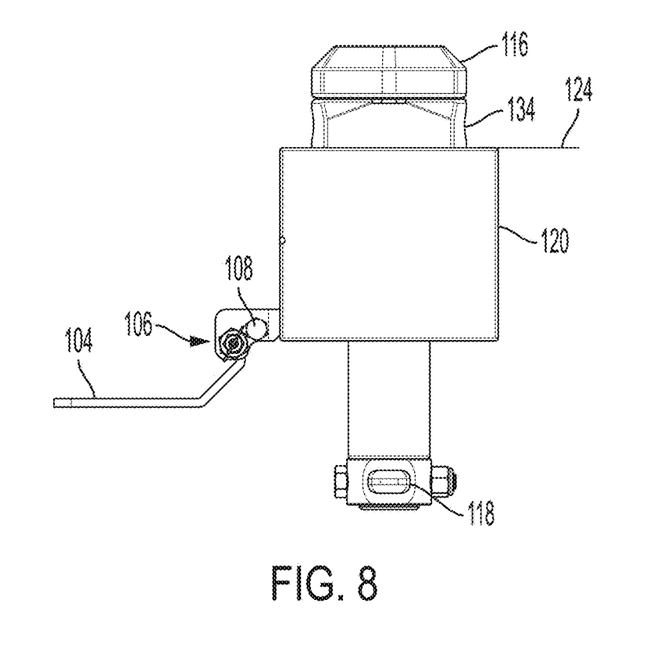
FIG. 8 is a side view of the swing latch and twistlock assemblies of FIG. 4 with twistlock load level in the lowest position, the twistlock unlocked, and the swing latch in the up position.
Figure 9:
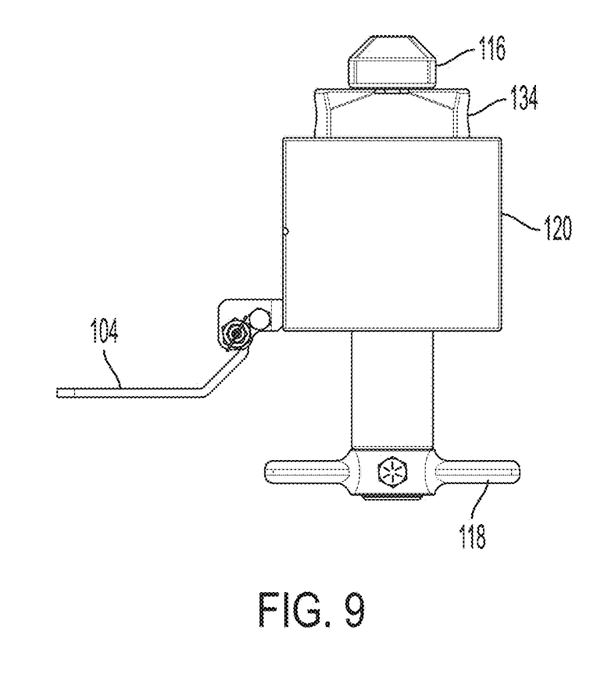
FIG. 9 is a side view of the swing latch and twistlock assemblies of FIG. 8 with the twistlock pin turned to the locked position.
Figure 10:
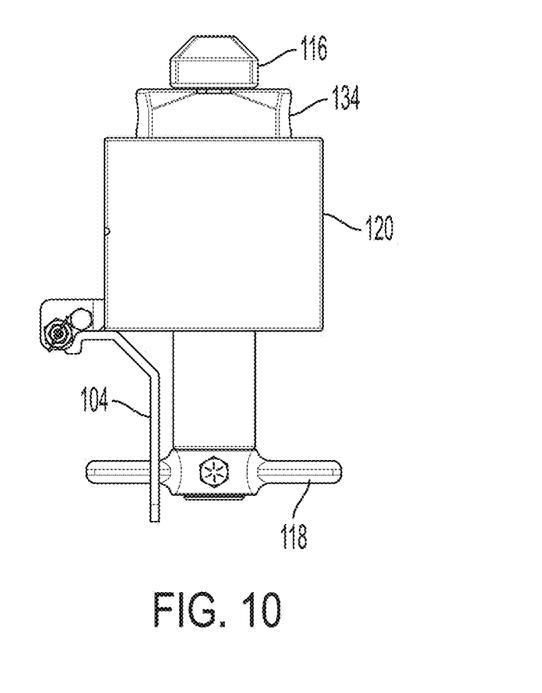
FIG. 10 is a side view of the swing latch and twistlock assemblies of FIG. 9 with the swing latch lowered to capture the T-handle of the twistlock assembly.

FIGS. 8-10 illustrate twistlock assembly 114 in its lowest non-retracted position. Load level 124 (where the shipping container sits and rests while being loaded with freight) is at the top of twistlock housing base 120. In FIG. 8 twistlock assembly 114 is unlocked and swing latch 104 is in the up position. To arrive at the non-extended locked position shown in FIG. 9, T-handle 118 can be rotated 90 degrees, without any lifting of T-handle 118, to rotate the head of twistlock pin 116 relative to shear block 134 while shear block 134 is in a locked position within the twistlock assembly. In FIG. 9, T-handle 118 has been rotated to turn twistlock pin 116 to the locked position. In FIG. 10, swing latch 104 is lowered to capture T-handle 118 of twistlock assembly 114 (which is accomplished by pulling pull pin 110 outwards to disengage swing latch 104 from pull pin 110, allowing swing latch 104 to lower so that slot 112 of swing latch 104 engages on T-handle 118 of twistlock assembly 114). Pull pin 110 can now be released, so that the pull pin engages on a surface of swing latch 104. At this point, T-handle 118 cannot rotate, and so twistlock assembly 114 is fixed in the locked position. To unload a shipping container from the vehicle, a user can pull pull pin 110 outwards again, lift swing latch 104 into the up position, and rotate T-handle 118 to rotate the head of pin 116 so that the head of pin is parallel to shear block 134. Now, a shipping container can be lifted off of the vehicle. Pull pin 110 can now be released, so that the pull pin engages on another surface of swing latch 104.

Figure 11:
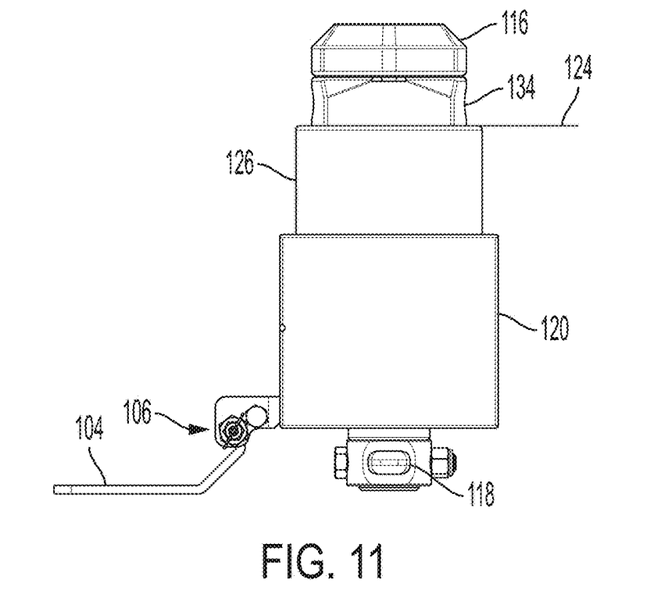
FIG. 11 is a side view of the swing latch and twistlock assemblies of FIG. 4 with twistlock load level in the highest position, the twistlock unlocked, and the swing latch in the up position.
Figure 12:
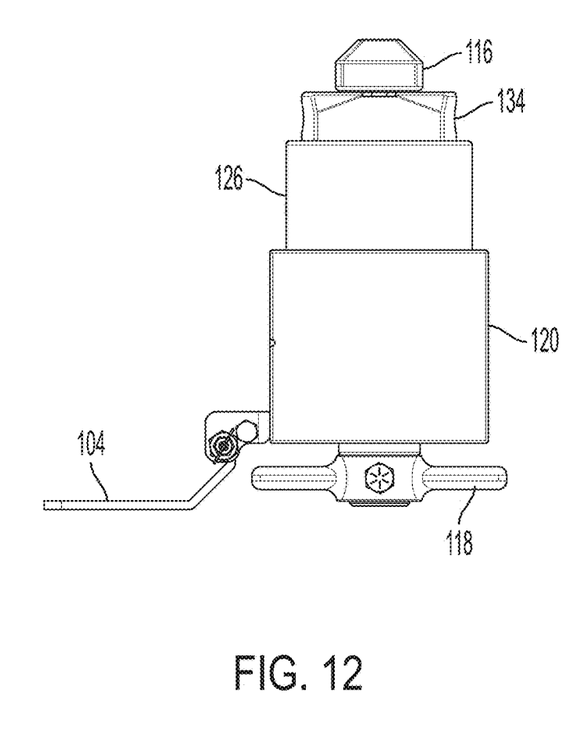
FIG. 12 is a side view of the swing latch and twistlock assemblies of FIG. 11 with the twistlock pin turned to the locked position.
Figure 13:
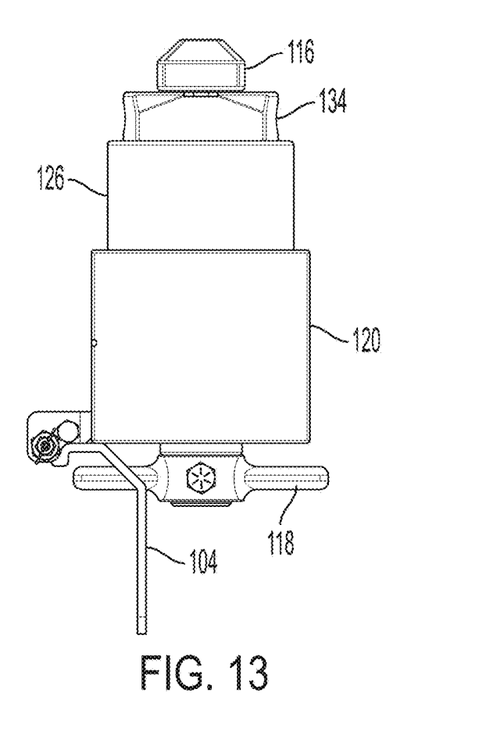
FIG. 13 is a side view of the swing latch and twistlock assemblies of FIG. 12 with the swing latch lowered to locked position to capture the T-handle of the twistlock assembly.

FIGS. 11-13 illustrate twistlock assembly 114 in its highest non-retracted position. The twistlock assembly can be adjusted from the non-extended locked position shown in FIGS. 8-10 to the fully extended, maximum height, locked position shown in FIGS. 11-13 by first turning T-handle 118 90 degrees to rotate the head of pin 116 into alignment with shear block 134, and then lifting and rotating T-handle 118 to rotate shear block 134 and the head of pin 116 into alignment with a main center hole in twistlock inner housing 126 so that the head of pin 116 and shear block 134 drop into the main center hole in twistlock inner housing 126, which brings the twistlock assembly into a fully retracted position. Then T-handle 118 can be rotated to cause cylindrical twistlock inner housing 126 to be threaded upwards within twistlock housing base 120, which has a square horizontal cross-section, the external threads of twistlock inner housing 126 engaging internal threads of twistlock housing base 120, such that all components other than twistlock housing base 120 rotate relative to twistlock housing base 120 until twistlock inner housing 126 is extended to the desired height. In this manner, inner housing 126 threads up and down inside outer twistlock housing base 120. Then, T-handle 18 is lifted to cause the head of pin 116 and shear block 134 to be pushed upwards within the main center hole in twistlock inner housing 126 until the head of pin 116 and shear block 134 are all clear of the main center hole in twistlock inner housing 126. Then, T-handle 118 can be turned 90 degrees to rotate the head of pin 116 and shear block 134, after which shear block 134 can be allowed to drop into and rest within a shallow recess of twistlock inner housing 126. Next, T-handle 118 can again be rotated 90 degrees, without any lifting of T-handle 118, to rotate the head of pin 116 relative to shear block 134 while shear block 134 is locked within the shallow recess of twistlock housing 126.

Load level 124 (where the shipping container rests) is at the top of twistlock inner housing 126. In FIG. 11 twistlock assembly 114 is unlocked and swing latch 104 is in the up position. In FIG. 12, T-handle 118 is rotated to turn twistlock pin 116 to the locked position. In FIG. 13, swing latch 104 is lowered to engage with and capture T-handle 118 of twistlock assembly 114. At this point, T-handle 118 cannot rotate, and so twistlock assembly 114 is fixed in the locked position. If it is desired to unload a shipping container from the vehicle, pull pin 110 can be pulled back, and swing latch 104 can be lifted to the up position, after which pull pin 110 can be released, so that the pull pin engages on a surface of swing latch 104. Swing latch 104 is now in the up position, and T-handle can be rotated to rotate twistlock pin 116 so that the pin is parallel to shear block 134. Now a shipping container can be lifted off of the vehicle. Pull pin 110 can now be released, so that the pull pin engages on another surface of swing latch 104.

All parts of swing latch locking assembly 100 may be made of steel. Alternatively, base bracket 102 and swing latch 104 could be made from a different material such as a polymer (in which case base bracket would have to be attached to twistlock assembly 114 by a means other than welding).

There has been described a swing latch locking assembly for locking the locking pins of height-adjustable vehicle twistlock assemblies in both extended and non-extended positions. While a particular form of the invention has been illustrated and described, it will be apparent that various modifications and combinations of the invention detailed in the text and drawings can be made without departing form the spirit and scope of the invention. Accordingly, it is not intended that the invention be limited, except as by the appended claims.

What is claimed is:

1. A locking latch assembly for a twistlock assembly that is adjustable over a range of heights of a load level of the twistlock assembly relative to a deck level, comprising:
   a base bracket configured to be secured to a housing of the twistlock assembly;
   a swing latch having a central slot;
   an axle passing through the base bracket, the swing latch being secured around the axle to allow the swing latch to swing relative to the base bracket; and
   at least one pin secured on the base bracket, the at least one pin engaging a first surface of the swing latch when the swing latch is in a substantially vertical locked position in which the swing latch is at a first angular position relative to the base bracket, and engaging a second surface of the swing latch when the swing latch is in an unlocked position in which the swing latch is at a second angular position relative to the base bracket, wherein the at least one pin is configured to be disengaged from the swing latch to allow the swing latch to swing relative to the base bracket;
   the slot of the swing latch having a width sized to allow a T-handle attached to a T-shaped locking pin of the twistlock assembly to pass therethrough and to be substantially restricted from rotational movement while the swing latch is in the substantially vertical locked position and having a length sized to allow the T-handle of the twistlock assembly to pass therethrough throughout all of the range of heights of the twistlock assembly.

2. A locking latch assembly in accordance with claim 1, wherein the swing latch is a substantially flat rectangular element.

3. A locking latch assembly in accordance with claim 2, wherein the substantially flat rectangular element has a main lower portion and an upper portion that is angled with respect to the main lower portion.

4. A locking latch assembly in accordance with claim 1, wherein the central slot is a vertical slot that is approximately three inches long.

5. A locking latch assembly in accordance with claim 1, wherein the second angular position of the swing latch is a substantially horizontal position.

6. A locking latch assembly in accordance with claim 1, wherein the pin acts on the swing latch close to the axle passing through the base bracket.

7. A locking latch assembly in accordance with claim 1, wherein pin is a pull pin of a pull pin assembly.

8. A locking latch assembly in accordance with claim 7, wherein the pull pin is spring loaded within the pull pin assembly.

9. A locking latch assembly in accordance with claim 8 wherein the pull pin assembly comprises a ring with which the spring-loaded pull pin can be retracted away from engagement with the latch.

10. A locking latch assembly in accordance with claim 7, wherein the pull pin assembly comprises a nut welded to the base bracket.

11. A locking latch assembly in accordance with claim 10, wherein the pull pin assembly further comprises a nut attached to the pin.

12. A locking latch assembly in accordance with claim 1, wherein the base bracket is configured to be secured to a side surface of a housing base of the twistlock assembly.

13. A twistlock assembly that is adjustable over a range of heights of a load level of the twistlock assembly relative to a deck level of the twistlock assembly, comprising:
   a housing base;
   a T-shaped locking pin rigidly connected with a shaft, the T-shaped locking pin having an adjustable vertical position relative to the housing base of the twistlock assembly that corresponds to a vertical position of the load level of the twistlock assembly relative to the deck level of the twistlock assembly;
   a T-handle attached to the T-shaped locking pin; and
   a locking latch assembly comprising:
      a base bracket secured to the housing base of the twistlock assembly;
      a swing latch having a central slot;
      an axle passing through the base bracket, the swing latch being secured around the axle to allow the swing latch to swing relative to the base bracket; and
      at least one pin secured on the base bracket, the at least one pin engaging a first surface of the swing latch when the swing latch is in a substantially vertical locked position in which the swing latch is at a first angular position relative to the base bracket, and engaging a second surface of the swing latch when the swing latch is in an unlocked position in which the swing latch is at a second angular position relative to the base bracket, wherein the at least one pin is configured to be disengaged from the swing latch to allow the swing latch to swing relative to the base bracket;
      the slot of the swing latch having a width sized to allow the T-handle attached to the T-shaped locking pin of the twistlock assembly to pass therethrough and to be substantially restricted from rotational movement while the swing latch is in the substantially vertical locked position and having a length sized to allow the T-handle of the twistlock assembly to pass therethrough throughout all of the range of heights of the twistlock assembly.

14. A twistlock assembly in accordance with claim 13, wherein the base bracket is welded to the bottom of the housing base.

15. A twistlock assembly in accordance with claim 13, wherein the base bracket is secured to a side surface of the housing base.

16. A twistlock assembly in accordance with claim 15, wherein the base bracket is secured to the side surface of the housing base near the bottom of the housing base.

17. A twistlock assembly in accordance with claim 13, wherein the housing base is configured to be mounted to a flatbed deck of a vehicle at the top of the housing base.

18. A twistlock assembly in accordance with claim 13, further comprising an inner housing that can be raised or lowered within the housing base.

19. A twistlock assembly in accordance with claim 18 wherein, wherein the housing base is configured to be mounted to a flatbed deck of a vehicle at the top of the housing base such that the top of the inner housing is at a load level at which a shipping container can sit and rest.

20. A twistlock assembly in accordance with claim 13, wherein the locking latch assembly is a secondary locking mechanism of the twistlock assembly.

\* \* \* \* \*